July 11, 1967  TSUTOMU KUWATA ETAL  3,330,749
PROCESS FOR TREATING AMINO ACID SOLUTION
Filed March 20, 1962  2 Sheets-Sheet 1
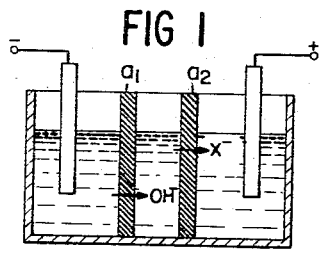
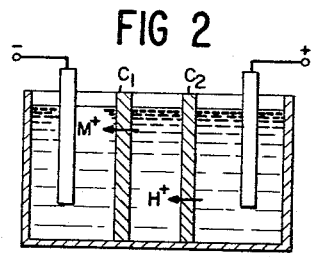
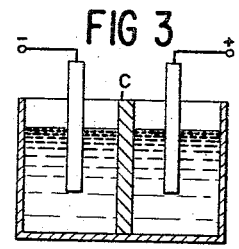
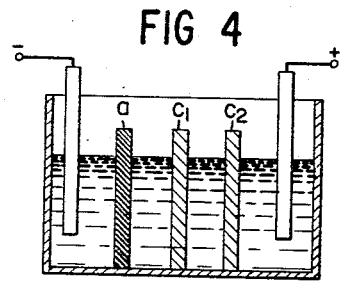
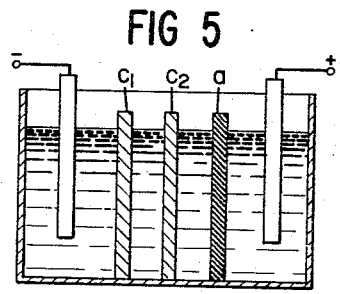
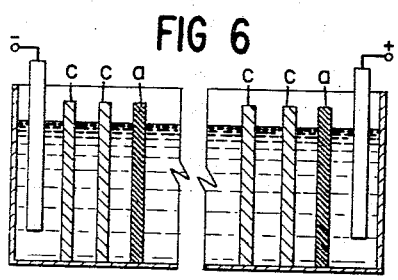
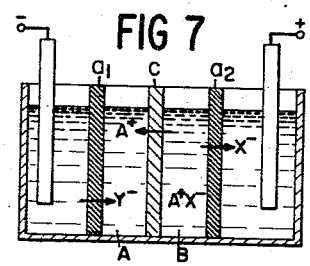
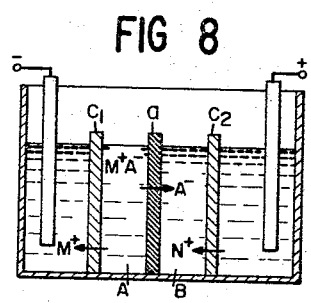
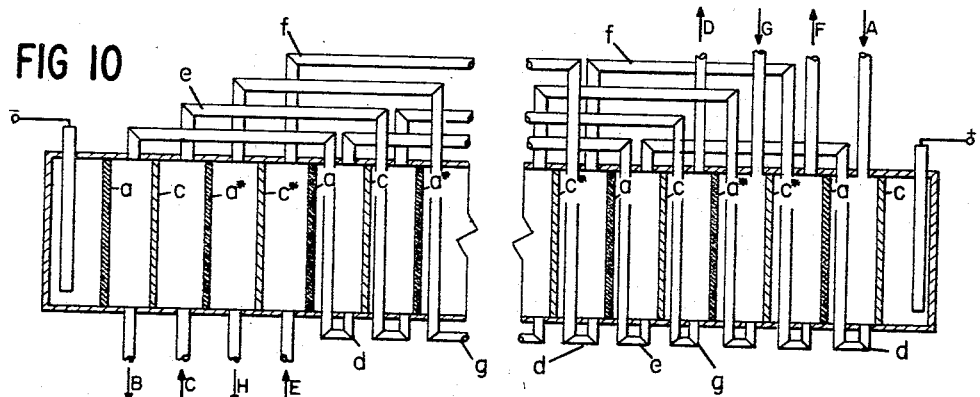
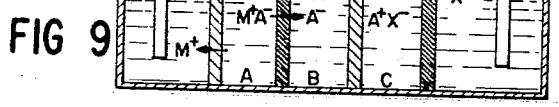
INVENTORS
Tsutomu Kuwata
Sadao Yoshikawa
Yujiro Hara
by Wenderoth, Lind & Ponack
Attorneys

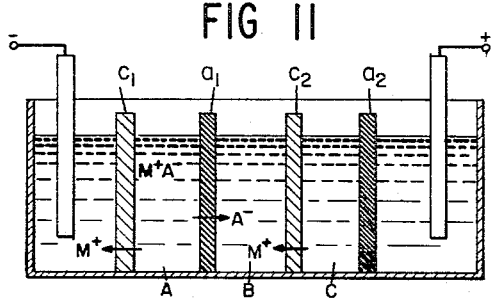
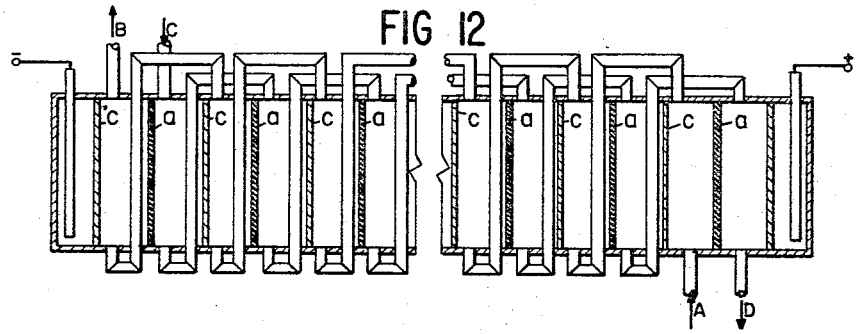
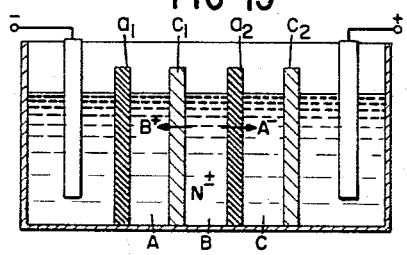
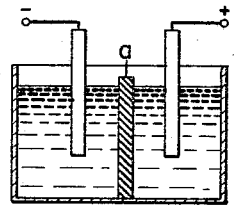
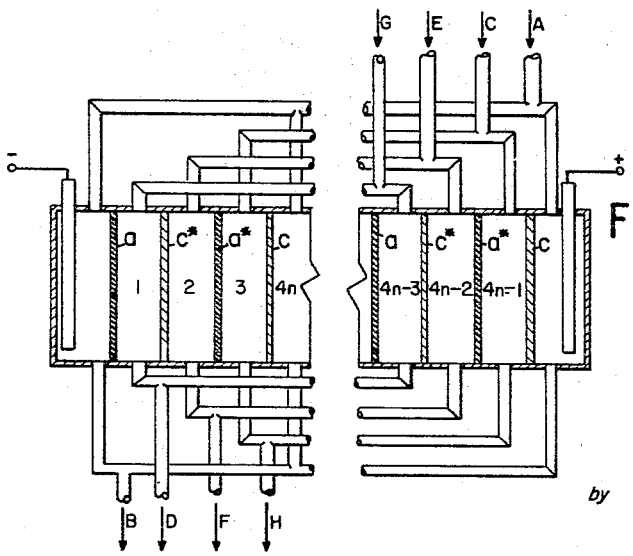

United States Patent Office 3,330,749
Patented July 11, 1967

3,330,749
PROCESS FOR TREATING AMINO ACID SOLUTION
Tsutomu Kuwata, Sadao Yoshikawa, and Yujiro Hara, Tokyo, Japan, assignors to Takeda Chemical Industries, Ltd., Osaka, Japan
Filed Mar. 20, 1962, Ser. No. 181,104
Claims priority, application Japan, Feb. 11, 1958, 33/3,379
6 Claims. (Cl. 204—180)

This application is a continuation-in-part of application Ser. No. 791,596, filed Feb. 6, 1959, and now abandoned.

This invention relates to a novel process for obtaining free amino acids from amino acid salts, or converting such salts having determined anions or cations linked to the amino acid zwitter ion to amino acid salts with different anions or cations. This invention further relates to a novel process for the concentration of aqueous solutions of amino acid salts, as well as to a novel process for the separation of amino acids.

The hitherto known processes for isolating free amino acids from amino acid salts call either for the addition of an organic or inorganic acid or a base to such salts and for the separation of the salts, newly formed by such acid or base, from the liberated amino acid by utilizing differences in their solubility, or for a direct reaction of the solution of amino acid salts with ion exchange resin to liberate the amino acids.

In the processes of the first type, the salts newly formed by addition of acid or base, are invariably mixed products, and if it is desired to produce a pure amino acid as is often the case, it is necessary to recrystallize the product repeatedly. This results in a decrease of the yield; moreover, the difference between the newly formed salt and the free amino acid in solubility is often small, so that their separation is extremely difficult.

Amino acids are produced frequently from hydrolyzates of proteins which contain various kinds of amino acids, and numerous processes are known for the separation of individual amino acids or isolation of a specific amino acid from these hydrolyzates. However, none of these is fully satisfactory and none has been found to be sufficiently effective to be suitable for use on an industrial scale.

Representative processes for the separation of amino acids comprise the distillation of amino acid esters, solvent extraction, electrodialysis using biological and synthetic diaphragms, and separation by ion exchange resin. Of these, only the above-mentioned process using ion exchange resin has been tried in practice on an industrial scale. In general, the separation of amino acids by the use of ion exchange resin is effected by the combination of strongly acid and weakly acid cation exchangers, or strongly basic and weakly basic anion exchangers. In order to effectively carry out the separation using granular ion exchange resin, it is necessary to use highly dilute solutions of less than a few hundred parts per million concentration. Therefore, when such a process is used on an industrial scale, the cost necessary for the concentration of the solutions, be it of mainly aqueous of amino acid salts or free amino acids become excessive and, in addition, the regeneration of the ion exchange resin for continuous operation becomes extremely complicated and is usually accompanied with much difficulty.

Separation of amino acids has also been attempted with the aid of electrodialysis, using diaphragms of gelatine, collodion, parchment paper, cellophane, etc., but these membranes are very low in their ability to permeate ions selectively, and leaks of acids and alkalis formed generally occurring in the electrolytic chamber. This makes it difficult to adjust the hydrogen ion concentration in the intermediate compartment. Moreover, it is not possible to manufacture from the aforesaid materials large sized membranes wihch have a high electric resistance and which are capable of withstanding sufficiently long use. It has been impossible therefore to separate amino acids on an industrial scale by electrodialysis involving the use of such diaphragms. The problems discussed above have been extremely difficult to solve, and the search for a suitable combination of cation and anion exchange membranes, which are satisfactorily permselective to allow selective passage of cations, or anions as the case may be, the membranes acting sometimes as transport membrane and sometimes as intercepting membranes, has been unsuccessful in the past.

It is an object of the present invention to provide more efficient ways and means for carrying out the processes described above than were thus far employed.

It is a further object of the present inventors to solve the difficulties encountered in the above-discussed known processes, utilizing the well known facts that an amino acid behaves as a zwitter ion at the iso-electric point, and like a cation after dissociation at a pH below that of the isoelectric point, while it behaves like an anion at a pH above that of the isoelectric point, and that such ions in the electrolytic cell move toward electrodes of different charges, respectively, but do not show such mobility at the isoelectric point.

It is yet another object of our invention to provide novel processes and dynamic electrodialytic systems for the separation and/or purification of amino acid salts and free amino acids which permit the use of commercially available electrodialytic membranes in such a manner that high selectivity and a long operational life of these membranes are achieved together with highly satisfactory yields, thereby making the aforesaid process and systems applicable on an industrial scale.

FIGS. 1 to 15 inclusive constitute diagrammatic illustrations of electrolytic cells employed in connection with the process of the present invention.

One of the modes of carrying out the process according to our invention for producing free amino acids from amino acid salts comprises leaving amino acid ion in a compartment formed between two ion exchange membranes or in an electrode compartment with a single ion exchange membrane as a diaphragm, and causing other cations or anions to pass through these ion exchange membranes into an adjoining compartment. Another mode of carrying out the same process in practice is to reverse this order and allow passage of amino acid ion through at least one ion exchange membrane.

The first-mentioned mode of the said process will first be taken up. In the case of strong acid salts of amino acid, for example, the solution of such salts will contain amino acid cation and hydrogen ion, as well as anions of the strong acid, and the pH of this solution is lower than that of the isoelectric point of the amino acid. When such a solution is placed in a compartment separated by two anion exchange membranes ($a_1$ and $a_2$) in an electrolytic cell as shown in FIG. 1, of the accompanying drawings creating a potential difference between the two electrodes, hydroxyl ion (OH$^-$) is introduced from the cathode side, the anions (X$^-$) present originally, namely particularly the strong acid ions, will move to the anode side and the pH of the intermediate compartment will rise gradually. Theoretically, the flow of electric current should stop when the pH of the free amino acid has been reached. Actually, however, the selective permeability of an ion exchange membrane is not 100% perfect and there will be some leak of cations through the anion exchange membrane. This means that the amino acid will permeate through the anion exchange membrane ($a_2$) as an anion once the isoelectric point has been passed, and, therefore, in the process according to the invention, *the current flow must be interrupted at the isoelectric point.*

In the case of sparingly soluble amino acids, the liberated free amino acid will precipitate out on the membrane $a_1$ and this will make subsequent electrodialysis difficult. We have discovered that, in this case, crystallization of the amino acid on the membrane $a_1$ can be prevented by the presence of a small quantity of cation (such as $Na^+$) in the amino acid solution, whereby the reaction $A^+ + OH^- \rightarrow AOH$ will set in. $A^+$ represents the positively charged amino acid cation, and AOH the free amino acid obtained therefrom.

In the case of sodium salt of an amino acid, for example, its solution will contain, besides amino acid ion and hydroxyl ion, only sodium cations, but no further anions. In such a solution, the pH will be more on the alkaline side than the pH corresponding to the isoelectric point of the amino acid and the acid will be present as anion. When this kind of solution of amino acid is placed in a compartment separated by two cation exchange membranes ($c_1$ and $c_2$) as illustrated in FIG. 2, and hyyrogen ion is introduced from the anode side to transfer the cation $M^+$, for instance $Na^+$, to the cathode side, the pH of the solution will tend toward the acid side and electric current flow should virtually stop when this pH has reached the isoelectric point of the amino acid. Actually, however, a small quantity of anion will pass through the cation exchange membrane and the amino acid will start to move through the cation exchange membrane as a cation after the isoelectric point has been passed. Therefore, the flow of electric current must be interrupted as soon as the pH of the solution reaches the isoelectric point. In the case of a sparingly soluble amino acid, the free amino acid will precipitate out on the cation exchange membrane ($c_2$) and this will make subsequent electrodialysis difficult. We have found that, in this case, presence of a small quantity of anion in the amino acid solution will promote the reaction of $A^- + H^+ \rightarrow AH$ and prevent the precipitation of the amino acid on the membrane. $A^-$ represents the negatively charged amino acid anion, AH the free amino acid obtained therefrom.

In the two processes described above, if the amino acid is replaced by a mixture of amino acids the isoelectric points of which are different, only the amino acid with the lowest isoelectric point (when amino acid is a cation) or highest isoelectric point (when amino acid is an anion) will be obtained in free form. If it is desired to obtain other amino acids in this mixture in free form, the former amino acid will precipitate out on the anode (when amino acid is a cation) or on the cathode (when amino acid is an anion). Therefore, the above-described processes are not suitable when a mixture of amino acids with different isoelectric points is used.

Examples of electrolytic cells illustrated in the accompanying drawings, and suited for use for the foregoing two methods include, besides the two mentioned above, the following combinations, which are suitable for salts between amino acid and strong bases: Anode chamber (ion exchange-reaction compartment)-cation exchange membrane-cathode compartment (FIG. 3), anode-compartment-cation exchange membrane ($c_2$)-ion exchange-reaction compartment-cation exchange membrane ($c_1$)-intermediate compartment-anion exchange membrane ($a$)-cathode chamber (FIG. 4), anode chamber-anion exchange membrane ($a$)-intermediate compartment-cation exchange membrane ($c_2$)-ion exchange-reaction compartment-cation exchange membrane ($c_1$)-cathode chamber (FIG. 5), and a combination of these units in plural numbers (FIG. 6). In the case of salts between amino acid and strong acids, an electrolytic cell can be used in which the cation and anion exchange membranes in the above systems have been exchanged for each other.

The processes described above wherein the amino acid ions remain in the compartment separated by diaphragms while the other ions are moved outside the diaphragms have given satisfactory results in the recovery of the mineral acid (such as hydrochloric acid) from a solution of a mineral acid salt of *l*-glutamic acid, recovery of alkali from alkaline solution of *dl*-glutamic acid, recovery of majority of mineral acid from a solution of protein hydrolyzate, and for removal of inorganic electrolytes from *l*-glutamic acid obtained by the fermentation process and from culture filtrate of *l*-lysine, for instance.

The second process for manufacture of free amino acids from their salts is based on the use of certain permselective ion exchange membranes which, as we have found, possess permeability for either positive or negative amino acid ions, and the permeability of which to these amino acid ions can be controlled under certain operational conditions discovered by us and described hereinafter.

The electrode zones, the starting zones, containing the amino acid medium to be treated, and the intermediate zones serving as receptor zones, if such are provided, are disposed in series in the cells described hereinafter and separated from each other by permselective ion-exchange membranes which must fulfill certain critical requirements in order to possess the necessary selective permeability for the inorganic ions being transferred through certain parts of the system, on the one hand, and for the positively or negatively charged amino acid ions, on the other hand.

"Ordinary" membranes mentioned hereinafter are permselective membranes permitting passage of either cations or anions of inorganic or organic substances therethrough, but being largely impervious to amino acid ions. They therefore act as "intercept" membranes for the latter.

Amino-acid permeable membranes mentioned hereinafter are permselective membranes permitting passage of the aforesaid cations or anions as well as of amino acid cations or anions, respectively. Throughout this specification, the terms "permselective membrane" and "ion exchange membrane" are used synonomously.

These membranes serving as diaphragms in the process of the invention consist essentially of a polymeric ion-exchange resin material which has been specially treated to have the critical water content and mean pore size stated hereinafter.

The ion exchange membranes used as diaphragms in the electrolytic cells in the processes of this invention are, firstly, cation exchange membranes of sulfonic acid, carboxylic acid, and hydroxyl systems such as styrene-p-sulfonic acid-butadiene copolymer, styrene-p-sulfonic acid-divinylbenzene copolymer, and phenol-p-sulfonic acid-formaldehyde copolymers, and secondly, anion exchange membranes of amine system chiefly consisting of quaternary ammonium salts such as p-methyleneaminostyrene-butadiene copolymer and p-methyleneaminostyrene-divinylbenzene copolymer.

Preferred amino acid permeable ion exchange membranes used as diaphragms in the electrolytic cells in the process of this invention are cation exchange membranes of sulfonic acid system such as styrene-p-sulfonic acid-butadiene copolymer, and anion exchange membranes of amine system chiefly consisting of quaternary ammonium salts such as p-methyleneaminostyrenebutadiene copolymer. The size of pores in these ion exchange membranes should be such as to permit selective permeability of inorganic ions e.g. 5 to 50 and preferably 5 to 20 A. in diameter.

Certain membranes which can serve as amino-acid permeable membranes in the electrodialysis of amino acids according to the invention, are described in Japanese Patents 248,669 and 239,724 and British Patent 793,212 and are useful as amino acid cation-selective membranes in the process of our invention, and others, described in Japanese Patent 239,596 and British Patent 804,176, are useful as amino acid anion-selective membranes in the present process.

The manufacture of membranes which we have found to be useful as amino acid ion permeable membranes in the process of our invention is also described in Patent No. 2,730,768 to Clarke.

The first-mentioned membranes which are selectively permeable to cations, have acceptable tensile and conductivity properties and freedom from cracking when in use, and are obtained by sulfonation of a film comprising a copolymer of an aromatic mono-vinyl compound with a linear aliphatic polyene hydrocarbon, said copolymer containing from about 30 to 70% by weight of the aromatic vinyl compound. "Copolymer" as used herein means a copolymer itself as well as its vulcanized products.

Examples of aromatic monovinyl compounds are styrene, vinyl toluene, vinyl xylene, ethyl styrene, and diethyl styrene. Examples of suitable linear aliphatic polyene hydrocarbons are butadiene and isoprene.

The preferred sulfonating agent is concentrated sulfuric acid, because it permits a relatively mild sulfonation; oleum with less than 20% $SO_3$ and chlorosulfonic acid can also be used. The sulfonation temperature should be close to room temperature and preferably below 50° C.

The above-mentioned membranes which are selectively permeable to anions and which are described, for instance in British Patent 793,212 supra, consist of vulcanized or cyclized copolymers of an aromatic vinyl compound such as the above-enumerated styrene, vinyl toluene, vinyl xylene and ethyl styrene as well as methyl styrene and methylvinylpyridine, and an aliphatic conjugated polyene compound such as butadiene, isoprene and 1,3,5-hexatriene. Most suitable are the copolymers which contain about 25 to 75% by weight of the aromatic vinyl compound, preferably styrene.

One important factor in carrying out the processes according to the invention in practice, is the pore size of these membranes. This pore size should range between 5 to 50 Angstroms in diameter. We have found that, if pores are smaller than the above minimum pore size, transfer of amino acid ions is substantially impeded and the resulting increase in resistance leads to undesirable electrolysis of water at a relatively low current density; while, if the maximum pore size limit is exceeded, the transfer of water through the membranes by electro-osmosis competes so strongly with that of amino acid ions that the resulting purified solutions become too diluted, thus making the process uneconomical.

Generally, the pore size of an ion exchange resin is related to and can be expressed by the water content of the resin swollen in water, if the same type of resin is concerned. In the following table, therefore, the relationship of preferred ranges of pore sizes of an ion exchange membrane expressed by the water content of the membrane (the amount of water per unit weight of the dry resin) is correlated with various amino acids.

TABLE I

| | Number of carbon atoms | Water content in percent |
|---|---|---|
| lycine | $C_2$ | 20-35 |
| Alanine | $C_3$ | 25-40 |
| Aspartic acid | $C_4$ | 30-45 |
| Lysine | $C_5$ | 35-50 |
| Glutamic acid | $C_5$ | 40-55 |
| Thyrosine | $\phi C_2$ | 50-60 |

$\phi$=aromatic nucleus.

The above-stated widest limits of the pore size of the permselective membranes therefore corresponds to a widest limit of water contents as defined above, of between 20 and 60%.

The above-described copolymers are first subjected to a cross-linking reaction which determines the degree of porosity and then either to sulfonation whereby cation-permeable membranes are obtained, or to a special chloroalkylation and to an amination, whereby amino groups are introduced at the aromatic nuclei of the polymer molecules. Finally the aminated product is converted to the quaternary ammonium salt, whereby a negative group is introduced into the resin.

We prefer to apply the copolymer latex of the desired content of aromatic vinyl compound to a support of glass fiber cloth having a thickness in the order of about 0.05 to 0.25 millimeter in such amounts that the latex content of the resulting composite product is about 30 to 70% by weight.

This initial latex-glass fiber membrane is dipped into a cross-linking agent constituted by a solution of a weakly active Friedel-Crafts catalyst in a suitable organic solvent, for example, tin tetrachloride in n-hexane, or aluminum chloride in chloromethyl ether, at a temperature of 20° to 40° C., and preferably at about 30° C. for about 30 to 180 minutes and preferably for about 60 minutes, whereby, depending on the composition of the latex, there is achieved a cross-linking which imparts to the copolymer a coarse network structure, and correspondingly to the membrane the desired porosity, i.e. a mean pore size within the range of about 5 to 20 Angstroms.

Weakly active Friedel-Crafts catalyst suitable in the cross-linking step described above are anhydrous stannic chloride, titanium chloride, aluminum chloride ether complex and zinc chloride.

Solvents for these catalysts are n-hexane, tetrachloroethane, chloroform, carbon tetrachloride, carbon disulfide and trichloroethylene.

The above mentioned critical water content of the membrane is calculated on the basis of the total weight of the resin comprising the finished membrane excluding supporting material, as shall be explained in detail further below.

The anion of the above-described quaternary ammonium salt is either chlorine or another acid capable of quaternating the copolymer amino derivatives.

The longer the treatment within the above-stated time range, and the lower the content of the aromatic vinyl groups in the copolymer, the finer are the pores of the resulting membrane.

The latter is then either dipped in concentrated sulfuric acid (96% $H_2SO_4$) for several hours to achieve sulfonation and thereby obtain the membrane ready for use in the process according to our invention.

Or the resulting membrane is subjected to the aforementioned chloroalkylation, preferably to chloromethylation with chloromethylether at about 20 to 40° C., and then to a treatment with triethylamine-ethanol solution at room temperature. Washing of the resulting membrane with methanol yields a suitable anion-selective membrane of the quaternary ammonium type ready for use in the present process.

The critical water content of the final membrane is principally determined by that of the latex. Control of the water content in the latter during emulsion polymerization is conventional. The subsequent treatments of the latex-glass fiber membrane described hereinbefore do not materially effect this water content since they are all carried out at moderate temperatures not exceeding about 50° C. and usually lower, in the order of 20 to 30° C.

The properties of some ion exchange membranes employed in carrying out the embodiments of the present invention are shown in Table II further below.

In this table, the membranes are designated by C-1, C-2, C-3, A-1, A-2, A-3 and A-4; these membranes were produced as described in the following Examples I to VII.

In these examples all parts and percentages are by weight unless stated otherwise. The determination of the water content is discussed further below.

*Example I*

A latex of a styrene-butadiene copolymer having a styrene-butadiene ratio of 46:54 (by weight) is prepared by emulsion polymerizing under the conditions described in G. F. Whitby; Synthetic Rubber, pages 175–196 (John Wiley & Sons, Inc., New York).

The resulting latex contains about 40% of water. 4.5 to 4.7 kg. of this latex is applied to 5.5 kg. of glass fiber cloth having a thickness of about 0.10 millimeters, and there is obtained an initial latex-glass fiber membrane having a latex content of about 45 to 47%. This membrane is immersed in a 20% $SnCl_4$ solution in n-hexane at 30° C. for 60 minutes, thereby effecting a cross-linking reaction in the latex, and the cross-linked membrane is then immersed for 6 hours in a mixture consisting of 15% chloromethyl ether, 5% $SnCl_4$ and 80% tetrachloroethane at 30° C., thereby chloromethylating the copolymer in the membrane. The membrane is then washed with methanol and thereafter immersed in a saturated triethylamine solution in ethanol at room temperature for 16 hours. After washing with methanol, an anion-permselective membrane of the quaternary ammonium type is obtained which has a water content of 49.1% and a mean pore size of about 10–15 Angstroms. Other properties of this membrane which is designated as (A–3) can be seen from Table II below.

*Example II*

An initial latex-coated glass fiber membrane obtained as described in the first part in Example I is immersed for 17 hours at 25° C. in a mixture of 2% of n-hexane and 98% of $SnCl_4$, thereby effecting cross-linking in the copolymer. After washing with methanol, the membrane is then immersed in a 96% concentrated sulfuric acid at 25° C. for 17 hours, thereby effecting the introduction of sulfonic groups in the copolymer. The resulting cation-permselective membrane has a water content of 50.1 and a mean pore size of about 10–15 Angstroms.

This membrane is designated as (C–1) in Table II below.

*Example III*

An initial latex-coated glass fiber membrane obtained as described in the first part in Example I is immersed in concentrated sulfuric acid (96% $H_2SO_4$) for 8 hours at 25° C. thereby effecting simultaneously a bridge forming reaction and sulfonation which yields a membrane of the properties described in Table II under C–2.

*Example IV*

An initial latex-coated glass fiber membrane obtained as described in the first part in Example I is immersed for 6 hours at 30° C. in a mixture of 20% of $AlCl_3$-ether complex and 80% of tetrachloroethane, thereby effecting cross-linking in the copolymer. After washing with methanol, the membrane is then immersed in a 96% concentrated sulfuric acid at 30° C. for 17 hours, thereby effecting the introduction of sulfonic groups into the copolymer.

The resulting membrane has the properties described under C–3 in Table II below.

*Example V*

A latex of a styrene-butadiene copolymer having a styrene-butadiene ratio of 46:54 (by weight) is prepared by emulsion polymerizing under the conditions described in G. F. Whitby in "Synthetic Rubber," (19) pages 175 to 196, (published by John Wiley & Sons, Inc. New York, N. Y.).

The above latex-coated membrane is immersed for 3 hours at 25° C. in 20% $AlCl_3$-ether complex dissolved in tetrachloroethane, and then in a mixture of 13% chloromethyl ether, 2% $AlCl_3$-ether complex and 85% tetrachloroethane for 6 hours at 30° C. to effect chloromethylation. The membrane is then washed with methanol, immersed in a saturated triethylamine solution in ethanol at room temperature for 16 hours to give a quaternary ammonium type anion-permselective membrane the properties of which have been described in Table II below under A–1.

*Example VI*

Example V is repeated, however the temperature at which the membrane is immersed in the solution of the 20% $AlCl_3$-ether complex is 30° C. instead of 25° C.

The resulting membrane has the properties described under A–2 in Table II below.

*Example VII*

The latex obtained as described in Example V is further treated as follows:

The resulting latex contains about 40% of water. 4.5 to 4.7 kg. of this latex is applied to 5.5 kg. of glass fiber cloth having a thickness of about 0.10 millimeter, and there is obtained an initial latex-glass fiber membrane having a latex content of about 45 to 47%. This membrane is immersed in a 10% $AlCl_3$-ether complex solution in tetrachloroethane at 30° C. for 30 minutes, thereby effecting a cross-linking reaction in the latex, and the cross-linked membrane is then immersed for 6 hours in a mixture consisting of 15% chloromethyl ether, 2% $AlCl_3$-ether and 23% tetrachloroethane at 30° C., thereby chloromethylating the copolymer in the membrane. The membrane is then washed with methanol and thereafter immersed in a saturated triethylamine solution in ethanol at room temperature for 16 hours. After washing with methanol, an anion-permselective membrane of the quaternary ammonium type is obtained which has a water content of 53.6%. Its properties are those described under A–4 in Table II below.

The membranes obtained as described in Examples I to VII have good strength and durability because of their inclusion of glass fiber as supporting material.

The water content given in the preceding examples and other properties of the permselective membranes according to our invention are determined as follows:

The ion-exchange capacity ($A_R$) per one gram of ion-exchange membrane per one gram of Na-type (or $SO_4$-type) dry membrane is expressed in milliequivalents (m. eq.).

The water content (W) is a numerical value calculated according to the formula below from the weight ($a$) of a resin when wet and the weight ($b$) of the same resin when dried at about 110° C. by the following equation:

$$W = \frac{a-b}{a}$$

The ion concentration in a membrane ($A_W$) is a value in which the ion-exchange amount per one gram of water in an Na-type (or $SO_4$-type) ion-exchange membrane in wet state and is expressed in milliequivalents calculated from $A_R$ and W by the formula:

$$A_W = \frac{A_R(100-W)}{W}$$

The permeability (K), or water penetration ratio, is a value obtained by the measurement of the transferred amount of water (V) by osmotic pressure, when pure water and a solution are contacted through the ion-exchange membrane being tested, said value being expressed in cm.³ and calculated by the formula $$K = \frac{VN\eta}{SHT}$$

wherein V is the amount of water which has penetrated the membrane; N is the thickness of the membrane; $\eta$ is the viscosity of the water; S is the effective cross-sectional area of the membrane; H is the osmotic pressure and T is the temperature (in ° Kelvin).

In the experimental results shown in Table II, the comparative values relating to the porosity of the ion-permselective membranes used are approximately expressed with reference to the water content W in the copolymers forming the said membranes and to the permeability to water, i.e. the water penetration ratio K. In these experiments, an electrodialytic cell of the type shown in FIG. 9 is used. The intermediate chambers confined by these membranes are charged respectively, with an amino acid solution having approximately neutral hydrogen ion concentration, obtained by the hydrolysis of protein, and with the above-described receptive solution. During electrodialysis, the transfer of impure components dialyzed through anion-exchange membranes and the progressing purification of the amino acid solution are observed in order to evaluate the quality of the ion-exchange resin membranes.

TABLE II.—PROPERTIES OF ION EXCHANGE MEMBRANES (STYRENE-BUTADIENE COPOLYMER TYPE)

| Type | Notation | Capacity of ion exchange radical in membrane (meq./g.) | Concentration of ion exchange radical in membrane (meq./g.) | Water content of membrane, W (percent) | Water penetration ratio, K ($\times 10^{-6}$ cm.³) | Specific resistance, Ω-cm. | Ion selective permeability, 0.1 N NaCl | Thickness (mm.) |
|---|---|---|---|---|---|---|---|---|
| Cation exchange membrane. | C-1 | 1.32 | 2.13 | 50.1 | 0.32 | 100 | 0.92 | 0.28 |
|  | C-2 | 1.04 | 3.56 | 33.4 | 0.12 | 212 | 0.91 | 0.24 |
|  | C-3 | 1.31 | 2.14 | 59.6 | 0.91 | 81 | 0.82 | 0.23 |
| Anion exchange membrane. | A-1 | 1.69 | 3.16 | 34.9 | 0.23 | 250 | 0.91 | 0.26 |
|  | A-2 | 1.68 | 3.91 | 31.4 | 0.18 |  | 0.90 | 0.23 |
|  | A-3 | 1.78 | 1.84 | 49.1 | 0.45 | 120 | 0.85 | 0.45 |
|  | A-4 | 1.55 | 1.34 | 53.6 | 1.42 | 60 | 0.81 | 0.33 |

Another important feature of the processes and electrodialytic systems according to the present invention is based on our discovery that a critical factor of permeation of amino acid ions through the above-described amino-acid permeable membranes is the relationship between the iso-electric point of the amino acid contained in one first chamber of an electrodialytical system and the pH of the adjacent chamber separated from the aforesaid first chamber by the permselective ion-exchange membrane and destined to be the receptor chamber for the amino-acid ions.

We have found that the permeation of an amino acid ion through the above-described amino acid-permeable ion exchange membranes is remarkably influenced by the hydrogen ion concentration of the liquid in the receptor compartment separated by the membrane through which the amino acid ion in question is to be transferred, in such a manner that, if the hydrogen ion concentration of the liquid in the latter compartment differs from the iso-electric point of the amino acid in the compartment containing the same initially by more than 2 units taken in the direction of changing the sign of the electric charge on the amino acid ion, the amino acid cannot be permeated through the membrane.

It is clear that the amino acid containing liquid in the first or starting compartment must have a pH above that corresponding to the isoelectric of the amino acid, if the amino acid is to be present in the starting compartment prevalently as the amino acid anion.

The negative ion will be expected to move under the influence of the electric potential applied at the electrode of the electrodialysis cell toward the anode, and will be expected to do so through an amino acid anion-permselective membrane provided on the anode side of the first compartment, as long as the pH in the adjacent receptor compartment is also above the isoelectric point of the amino acid to be transferred as anion.

However, contrary to expectation, transfer of amino acid ions will also occur satisfactorily when the pH in the receptor compartment is below the isoelectric point of the amino acid to be transferred as anion, as long as the difference between the said isoelectric point and the lower pH in the receptor compartment is less than 2 pH units.

In other words, if the pH value corresponding to the isoelectric point of the amino acid is $x$, the pH of the medium in the reactor chamber must be maintained at a value above $x-2$, if the ion to be moved into said adjacent chamber is the amino acid anion, the membrane then being an amino acid-permeable, permselective anion exchange membrane. As an example, if the isoelectric point of the neutral amino acid, i.e. the zwitter ion stage, is 6, the pH in the adjacent chamber must not be lower than 4 and should preferably lie between 6.5 and 4.5. The pH in the chamber initially containing the amino acid, on the other hand, must be larger than $x$, and preferably between $x+3=9$ and $x+6=12$ in order to provide for the presence of sufficient amino acid anion in the starting chamber.

In the opposite case, if amino acid cations are to be transferred from a starting chamber through a cationic permselective membrane, into an adjacent receptor chamber, the pH in the starting chamber must be lower than the value corresponding to the iso-electric point of the amino acid therein. If the latter is, for instance, 10, the pH of the medium in the starting should be lower, and preferably between 7 and 4; the pH in the receptor chamber, on the other hand, must not exceed 12. We have found that at the latter pH value, the mobility of the cations of an amino acid whose iso-electric point is 10, into the receptor chamber, is already greatly diminished and above that limit value it is so low that operation of the electrodialytic system becomes uneconomical. At a pH of 13 the transfer of amino acid cations would be practically zero. The pH value in the receptor chamber for amino acid cations should therefore range between zero and $x+2$, when $x$ corresponds to the iso-electric point of the amino acid (zwitter ion).

Another important feature, based on the discovery of the above-discussed relationship between the iso-electric point of the amino acid to be treated, on the one hand, and the pH values of the medium containing the same in a starting chamber, and particularly the pH value of a receptor chamber separated from the starting chamber by an ion exchange membrane permselective to the particular type of amino acid ion which is to be transferred, resides in the use as receptor chambers of intermediate zones or chambers between the starting chambers and the electrode-containing zones or chambers. The media surrounding the electrodes in the latter zones are generally of rather high or low pH which must be fairly maintained to ensure good current flow and avoid excessively rapid deterioration of the electrodes and thereby shortened life of the entire system. The adjustment and control of the pH in the receptor zones, as a basic feature of the invention discussed hereinbefore, can therefore be carried out much better if these receptor zones are intermediate zones, and do not contain the electrodes at the same time.

The receptor zone or zones are therefore charged with aqueous solutions of an electrolyte which is dissolved in water in amounts corresponding to the required pH within the above-described critical limits. The aqueous receptor solutions used in these zones are aqueous solutions containing the afore-mentioned electrolyte, particularly a water-soluble alkali metal salt of a mineral acid such as, for instance, sodium chloride, sodium sulfate and the like, which salt is dissolved in water in amounts of about 0.1 to 0.2 gram per 100 grams of water. The pH of these receptor solutions if falling outside the above-described critical ranges, is adjusted by the addition of the necessary amounts of acid or basic agents, such as, for instance, sulfuric acid or sodium hydroxide, sodium sulfate, sodium acetate, sodium citrate, and the like.

The amino acids to be used as the starting material in these processes may possess suitable substituents, irrespective of aliphatic or aromatic system, and they may be acidic, neutral, or basic. Further, the amino acid may be a single individual or a mixture of several kinds, and the presence of electrolytes and non-electrolytes as impurities in these solutions of amino acid salts does not interfere with this process. To cite some of the compounds, glycine, alanine, valine, leucine, isoleucine, serine, threonine, cystine, cysteine, methionine, phenylalanine, tyrosine, lysine, arginine, proline, histidine, tryptophane, aspartic acid, glutamic acid, ω-aminocaproic acid, sulfanilic acid, taurine, and kainic acid may be used, and moreover substances containing various amino acids produced by hydrolysis or biological metabolism by microorganisms of proteins and peptides are also usable.

In FIGURES 7 to 15 of the accompanying drawings there are illustrated a number of different electrodialysis cell systems in which the process according to the invention involving transfer of amino acid ions through the above-described amino-acid ion permselective membranes represents the essential feature.

As illustrated in FIG. 7, a solution of a strong acid salt of an amino acid is placed in an intermediate compartment separated by two anion exchange membranes ($a_1$ and $a_2$) and one amino-acid permeable cation exchange membrane ($c$), and anion ($Y^-$) is introduced from the cathode side through the anion exchange membrane ($a_1$), while amino acid ion ($A^+$) is caused to permeate through the cation exchange membrane ($c$). When the anion $Y^-$ is hydroxyl, the amino acid will be recovered in free form and, when $Y^-$ represents another anion, $X^-$ will be exchanged for $Y^-$, thus converting the amino acid salt $A^+X^-$ to the salt $A^+Y^-$. $X^-$ and $Y^-$ may be anions of any mineral acid such as hydrochloric acid, sulfuric acid, phosphoric acid and the like. $Y^-$ may also be hydroxyl as pointed out above.

When amino acid ions of alkali metal or alkaline earth metal salts of amino acids are to be transferred, an electrolytic cell as illustrated in FIG. 8 is used, which possesses two intermediate compartments (A and B) divided by two cation exchange membranes ($c_1$ and $c_2$) and one amino-acid permeable anion exchange membrane ($a$). The amino acid solution is placed in the intermediate compartment A of this apparatus and, if the cation $N^+$ is hydrogen ion, the resulting free amino acid will be collected in B, and, when $N^+$ is another cation, there will occur ion exchange and a different amino acid salt will be obtained, i.e. the salt $M^+A^-$ will be converted to the salt $N^+A^-$.

The production of free amino acids can be also effected more efficiently by the combination of the above two processes of transferring amino acid residue as an anion or as a cation. In this case, an electrolytic cell such as illustrated in FIG. 9 may be used, which has three intermediate compartments (A, B and C) of which compartment A is separated from the cathode chamber by cation exchange membrane $c_1$, and from compartment B by amino acid permeable anion exchange membrane $a_1$, and compartment C is separated from compartment B by amino acid permeable cation exchange membrane $c_2$ and from the anode chamber by anion exchange membrane $a_2$. In this case, a solution of ammonium or alkali-metal or alkaline earth metal salts of an amino acid ($M^+A^-$) is placed in the left-hand one of the three intermediate compartments formed by placing anion and cation exchange membranes alternately (compartment A), and a solution of a strong acid salt of the amino acid ($A^+X^-$) is placed in the right-hand cell (compartment C), while solutions of electrolyte are placed in the cathode compartment, the anode compartment, and the intermediate compartment B. Electrodialysis of this unit will result in the introduction of positively and negatively charged amino acid ions into the central compartment B at the same time, and the free amino acid will be formed therein.

The electrolytic cells to be used in carrying out the process producing free amino acids by utilization of the permeability of amino acid ions through ion exchange membranes are not limited to the simple ones illustrated above. The unit may be provided with numerous intermediate compartments produced by alternately placing a large number of anion and cation exchange membranes between the two electrodes, or many such units may be connected and the solution may be allowed to flow between these compartments. A unit useful for industrial purposes is illustrated in FIG. 10, which is a flow unit provided with a large number of compartments divided from each other by alternately placing a corresponding number of ordinary anion excange membranes ($a$), amino acid permeable anion exchange membranes $a^*$, ordinary cation exchange membranes ($c$), and acino acid permeable cation exchange membranes ($c^*$).

The intermediate compartments in the unit illustrated in FIG. 10 are divided into four systems, and are connected, from top to bottom, by way of pipe-lines. Alkali hydroxide solution is placed in the cathode chamber and a mineral acid solution in the anode chamber. Aqueous solution containing a small quantity of electrolyte to impart electric conductivity to the solution of amino acid, is passed from A to B, from top to bottom through pipelines $d$, a solution of an ammonium or alkali metal or alkaline earth metal salt of amino acid is passed from C to D, from bottom to top through pipelines $e$, a solution of the salt of amino acid with strong acid from E to F, from bottom to top through pipelines $f$, and aqueous solution containing a small quantity of electrolyte, which gives electric conductivity, from G to H, from top to bottom through pipelines $g$. When electrodialysis is carried out while adjusting the flow rate of the solutions in these four systems, differences in ion concentrations of solution in each compartment will be maintained at a minimum, and an electrolyte solution will flow out continuously from B, almost pure water from D and F, and a free amino acid solution from H. In this way, continuous supply of amino acid salt solution from C and E will afford a concentrated solution of free amino acid, which will continuously flow out from H.

The process for the manufacture of free amino acids by utilization of the permeability of amido acid ion, as described in detail above, can be applied to solutions in a wide range of concentrations, the procedural operations are simple, and the amino acid obtained is of high purity since it is formed by passage through ion exchange membrane and there is no fear of contamination with amino acid salts and other ions. At the same time, concentration of amino acid solution is effected, so that this process has many advantages.

Some examples of the application of this process for manufacture of free amino acids include the removal of inorganic electrolyte from the culture solution of $l$-glutamic acid and $l$-lysine produced by fermentation process, and the manufacture of free amino acids from a protein hydrolyzate solution.

The concentration of amino acid salts by utilization of permeability of amino acid ion can also be carried out in an extremely simple manner.

For the concentration of an aqueous solution of ammonium or alkali metal or alkaline earth metal salts of amino acid, the unit illustrated in FIG. 11 may be used. This electrolytic cell is provided with three intermediate compartments (A, B and C) divided by alternately placed two cation exchange membranes ($c_1$ and $c_2$) and two anion exchange membranes ($a_1$ and $a_2$), of which membranes $a_1$ and $c_2$ are amino acid permeable and which are arranged in the same manner as in the cell illustrated in FIGURE 9. An amino acid salt solution $M^+A^-$ is placed in the intermediate compartments A and B, a solution containing a suitable amount of an electrolyte with the same ions as the cation in the amino acid salt solution is placed in compartment C, and potential difference is created between the two electrodes. The ions will then be transferred, as shown in the illustration. That is, both amino acid ions in compartment A and cation due to the electrolyte in compartment C are transferred into compartment B, and, therefore, the metal salt of amino acid in compartment B will be concentrated and that in compartment A will be diluted.

The concentration of a strong acid salt of amino acid can be effected in the same manner by placing the amino acid salt in compartments B and C, whereby the solution in compartment B is concentrated. In this case, an electrolyte solution having the same ion as that of the strong acid of the strong acid salt of amino acid must be placed in compartment A. This arrangement of the cell is illustrated in FIGURE 12 and will be discussed further below.

For concentration of alkali metal or alkaline earth metal salts, or strong acid salts, of amino acid on industrial scale, there is preferably used an electrolytic cell provided with two terminal electrode-containing compartments and a plurality of intermediate compartments therebetween, separated from each other by alternately placed anion and cation exchange membranes; moreover, in this type of electrolytic cell these intermediate compartments are preferably grouped into zones and each zone consists of two or more compartments which are connected with each other by the necessary piping leading from the bottom of one compartment of a zone to the top of the next following compartment pertaining to the same zone.

This will be better understood from the example of an electrolytic cell to be used for concentration of an aqueous solution of ammonium or alkali metal or alkaline earth metal salts of amino acid, which is illustrated in FIG. 12. This electrolytic cell is provided with a multiple number of intermediate compartments separated by a large number of alternately placed cation exchange membranes ($c$) and amino-acid permeable anion exchange membranes ($a^*$), and these intermediate compartments are connected with one another.

Electrolyte solution is placed in the cathode chamber, a solution containing a suitable quantity of electrolyte having the same ion as the cation in the amino acid salt solution to be concentrated in the anode chamber, and a solution of alkali metal or alkaline earth metal salt of amino acid to be diluted is passed from A to B, from bottom to top. The same amino acid salt solution to be concentrated is passed from C to D, from top to bottom. Electrodialysis is carried out while adjusting the flow rate of these solutions of two systems, by which the difference of ion concentrations in the compartments divided by diaphragms will be maintained at a minimum, and the solution to be diluted, introduced into A, will be devoid of the amino acid salt and will flow out of B in a state of almost pure water, while the solution to be concentrated, introduced into C, will flow out of D after it has been concentrated by the transfer of amino acid salt from the solution to be diluted.

Exactly the same procedure can be used in case the concentration of a strong acid salt of amino acid is to be carried out on an industrial scale. In such a case, the electrolytic cell to be used should be provided with a multiple number of intermediate compartments separated by a large number of alternately placed amino acid permeable cation exchange membranes ($c^*$) and anion exchange membranes ($a$) intead of ($a^*$) and ($c$), respectively, in FIG. 12.

Electrolyte solution is placed in the anode chamber and a solution containing a suitable quantity of electrolyte having the same anion as that in the amino acid salt solution to be concentrated is placed in the cathode chamber. Aqueous solution of an amino acid salt is poured into D and B, the concentrated amino acid salt solution is taken out of A, and the diluted solution from C.

The process for concentration of solutions of amino acid salts by utilization of the permeability of amino acid ion described above can also be applied to their decolorization. The process is employed for concentration of $l$-lysine salt and $l$-glutamate, for example.

A further process according to the invention is that for separating acidic, neutral, and basic amino acids from each other. This process for separating amino acids utilizes the fact that each of these amino acids possesses its characteristic iso-electric point.

As illustrated in FIG. 13 mentioned hereinbefore, an electrolyte cell is provided with electrode chambers and three intermediate compartments (A, B and C) formed by alternately placing two anion exchange membranes ($a_1$ and $a_2$) and two cation exchange membranes ($c_1$ and $c_2$), of which $a_1$ and $c_2$ are interceptor membranes and $a_2$ and $c_1$ amino acid permeable membranes. A solution of a mixture of acidic, neutral, and basic amino acids, adjusted to the iso-electric point of the neutral amino acid (such as pH 6), is placed in the intermediate compartment B, a solution the pH of which is below that of the iso-electric point of the basic amino acid is placed in compartment A, and a solution the pH of which is above that of the iso-electric point of the acidic amino acid is placed in compartment C.

While passing a flow of a dilute solution of non-basic alkali metal salts of organic acids, e.g., sodium acetate, or sodium citrate through the cathode and anode chambers, an electric potential is applied between the two electrodes, by means of which the basic amino acid ($B^+$) is caused to behave as a cation and the acidic amino acid ($A^-$) as an anion, and, therefore, the basic amino acid migrates toward the cathode and the acidic amino acid to the anode. Since the neutral amino acid ($N^+$) is at its iso-electric point, it remains in the compartment B, where it was first placed. Thus, the mixture of amino acids is separated into three groups. In this process, transfer of water tends to occur by electroosmosis caused by electrodialysis and some quantity of the neutral acids of lower molecular weight will move to either electrode through the membranes.

As an example, an electrolytic cell is to be used for separation of acidic, neutral and basic amino acids as illustrated in FIG. 15. This electrolytic cell is provided with a total number of $4n$ (wherein $n$ is at least equal to 2) alternately placed interceptor anion exchange membranes ($a$), amino acid permeable cation exchange membranes ($c^*$), amino acid permeable anion exchange membranes ($a^*$) and ordinary cation exchange membranes ($c$), and the resulting intermediate compartments and electrode compartments are so connected with one another as to form four separate flow systems. A dilute solution of non-basic salts of alkali metal, e.g., sodium sulfate, sodium acetate, sodium citrate, etc., is continuously passed through electrode compartments and central compartment ($4n$) from A to B, an aqueous solution containing a small quantity of neutral sodium salts, which impart electric conductivity thereto, through the two systems from C to H and from G to D respectively, and a solution of a mixture of acidic, neutral and basic amino acids, adjusted to the iso-electric point of the neutral amino acid (such as pH 6.0), through the system from E to F. Electrodialysis is carried out while adjusting the flow rate of these solutions of four systems, and at the end of electrodialysis, the solution of amino acids mixture will be devoid of the acidic and basic amino acids and will be obtained in the state containing substantially exclusively neutral amino acid alone, while the acidic amino acid to be separated will be transferred into the solution of the C–H system, and basic amino acid to be separated will be transferred into the solution of the G–D system.

When a solution of such a mixture of amino acids as above, but adjusted to the isoelectric point of the acidic amino acid (such as pH 3) is used, the neutral and basic amino acids will migrate toward the cathode as anions ($N^+$ and $B^+$), and the acidic amino acid ($A^{\pm}$) alone will remain in the original compartment.

When a solution of a mixture of the same amino acids, but adjusted to the isoelectric point of the basic amino acid (such as pH 7–10) is employed, the acidic and neutral amino acids will migrate toward the anode as anions ($A^-$ and $N^-$), and the basic amino acid ($B^{\pm}$) alone will remain in the original compartment.

The process for separation of the amino acid mixture into neutral, acidic, and basic amino acids described above can be applied to the manufacture of a seasoning solution consisting of a neutral or acidic amino acid or of basic amino acids such as *l*-lysine, the production of neutral and basic amino acids not contaminated with acidic amino acid to be used for the manufacture of solutions for injection, or for the recovery of *l*-lysine from its salts which are obtained by optical resolution of *d,l*-lysine, for instance.

The process for producing free amino acids from amino acid salts, concentration of amino acid salts, and separation of a mixture of amino acids through ion exchange membrane, has been described above.

As the salts between amino acids and strong bases, salts of the above-mentioned amino acids with alkali metal, alkaline earth metal, ammonia, and organic amines may be used. The strong acid salts of the amino acids include salts with mineral acids such as nitrate, sulfate, hydrochloride, and hydrobromide, or with strong organic acids such as organic sulfonate, hydrogen sulfate esters, and halogenated acetate.

It is desirable that current density in electrodialysis is great enough but not so much as to permit electrolysis of water. It goes without saying that this point is dependent on the nature of ion exchange membrane. Usually, 0.5–1 a./dm.$^2$ is the most suitable.

The electrode zones mentioned hereinbefore are charged with aqueous solutions of electrolyte such as sodium sulfate, sodium acetate, sodium citrate, sodium hydroxide, potassium hydroxide, ammonium hydroxide, preferred in the cathode-containing zone, and sodium sulfate, sodium acetate, sodium citrate, sulfuric acid, hydrochloric acid, and the like, in the anode-containing zone. However, depending upon the specific purposes of the electrodialytic system used for a process according to our invention, the above-listed electrolytes, or full chemical equivalents of the same, may also be used in the zone containing an electrode of opposite polarity to the one mentioned above. It is also recommended, in certain cases, to use the same electrolyte for both the cathode and the anode zone of the same electrodialytic system.

The concentration of the electrolytes ranges preferably from about 1/60-normal to 1-normal, but may be varied even between wider limits; however, 1/100-normal as a minimum and 2-normal as a maximum should not be exceeded.

The electrodes dipping into these solutions in the electrode zones are of the material conventionally used in electrodialysis, namely graphite, platinum or lead as anode and graphite, platinum, nickel, stainless steel or iron as cathode.

In the compartments serving as receptor compartments, the initial aqueous solutions are those of electrolytes with a pH within the range indicated above as being critical relative to the isoelectric point of the amino acid being treated. Preferably the pH is that of an aqueous sodium chloride solution; however, other electrolytes may be used such as preferably buffered solutions of sodium citrate, sodium (ortho/meta) phosphate, etc. The pH value of these solutions may vary between 5 and 7.

In the operation of the cells illustrated in FIGURES 10, 12 and 15, the aqueous solutions in the various zones of the cell are not stationary, with the exception of the anolyte and catholyte in FIGURES 10 and 12, but are caused to flow at rates about 0.2–2 l. per dm.$^2$ surface of membrane per minute.

It is preferred to maintain the flow rate according to the concentration of the electrolyte and the current density, the flow rate being calculated as volume per unit surface area of the ion permselective membrane used per minute.

For example, the preferable flow rates of sodium sulfate solution when the concentration and the current density are varied respectively are given in Table III.

TABLE III

| Current density (a./dm.$^2$) | Flow rate (l./dm.$^2$ surface of membrane/min.) | |
|---|---|---|
| | 3% sodium sulfate | 6% sodium sulfate |
| 0.1 | 0.2 | 0.1 |
| 0.5 | 0.9 | 0.45 |
| 1.0 | 1.5 | 0.75 |
| 1.5 | 2.0 | 1.0 |

The following non-limitative examples are given to illustrate how the process according to the invention can be carried out in practice.

In these examples, all percentages are by weight unless stated differently. All solutions are aqueous solutions, the pH of N/10-sodium hydroxide solution being, of course, 13, and that of N/10-sulfuric or hydrochloric acid, being 1.

*Example 1*

An electrolytic cell, 3 cm. in length, 7.5 cm. in width, and 7.5 cm. in depth, as illustrated in FIG. 1, is provided with two anion exchange membranes A–2, ($a_1$ and $a_2$), a nickel plate ([7.5 cm.]$^2$) as the cathode, and a platinum plate ([7.5 cm.]$^2$) as the anode. 50 cc. of N/10 sodium hydroxide is placed in the cathode chamber, a solution (pH 0) of 5.0 g. of *l*-glutamic acid sulfate and 50 mg. of sodium sulfate in 50 cc. of water is placed in the central compartment, and 50 cc. of N/10 sulfuric acid in the anode chamber. Direct current with initial current density of 2 a./dm.$^2$ is passed through this unit and pH of the solution (in the central compartment) becomes 3.2 after 6 hours, the current being almost stopped. The white crystals that separate out in the central compartment are collected to give 3.3 g. of *l*-glutamic acid, melting at 206° C. Yield, 96%.

*Example 2*

An electrolyte cell, 2 cm. in length, 7.5 cm. in width, and 7.5 cm. in depth, as illustrated in FIG. 14, is provided with one anion exchange membrane A–2, (*a*), and platinum plates ([7.5 cm.]$^2$) as cathode and anode, respectively. A solution (pH 1) of 18.3 g. of *dl*-methionine sulfate in 50 cc. of water is placed in the cathode chamber, 50 cc. of N/10 sulfuric acid solution is placed in the anode chamber, and a direct current with initial current density of 1 a./dm.$^2$ is passed for 8 hours, at the end of which the pH in the cathode chamber reaches about 6.0. The white scaly crystals that separate out in the cathode chamber are collected to obtain 12.4 g. of *dl*-methionine melting at 268° C. Yield, 92%. Current efficiency, 67%.

*Example 3*

The same electrolytic cell as used in Example 2 (FIGURE 14) is provided with a nickel plate ([7.5 cm.]$^2$) as the cathode and platinum plate ([7.5 cm.]$^2$) as the anode. A solution of 8.0 g. of ω-amino-n-caproic acid sulfate in 50 cc. of water is placed in the cathode chamber, 50 cc. of N/10 sulfuric acid in the anode chamber, and electrodialysis is carried out at the initial current density of 1 a./dm.$^2$. After 6 hours, pH of the solution will become 6.0 and the current is cut off. Concentration of the cathode solution gives 5.6 g. of ω-amino-n-caproic acid melting at 195–200° C. Yield, 96%. Current efficiency, 36.4%. The pH of the starting solution in the cathode chamber is 1.0.

Example 4

An electrolytic cell, 7.5 cm. in depth, 7.5 cm. in width, and 15 cm. in length, as illustrated in FIG. 2, is provided with two cation exchange membranes ($c_1$ and $c_2$) to form compartments each with a length of 1 cm. nickel plate ([7.5 cm.]$^2$) as the cathode, and platinum plate ([7.5 cm.]$^2$) as the anode. 50 cc. of N/10 sodium hydroxide is placed in the cathode chamber, a solution of 5.7 g. of disodium $l$-glutamate and 50 mg. of sodium sulfate dissolved in 50 cc. of water in the intermediate reaction compartment, and 50 cc. of N/10 sulfuric acid is placed in the anode chamber. Electric current with initial current density of 1 a./dm.$^2$ is passed while stirring the solution in the reaction compartment. After 5 hours, pH of the solution will become 3.2 and current will hardly flow. The white crystals that separate out in the reaction compartment are collected to obtain 3.2 g. of $l$-glutamic acid melting at 206° C. Yield, 92%.

The cation exchange membranes are of the type C-2, and the pH of the starting solution in the intermediate compartment is 11.4.

Example 5

The same electrolytic cell as used in Example 4 (FIG. 2), provided with the same electrodes, is employed. A solution of 3.92 g. of the sodium salt of $l$-lysine in 50 cc. of water is placed in the intermediate reaction compartment, 50 cc. of N/10 sodium hydroxide solution in the cathode chamber, and 50 cc. of N/10 sulfuric acid solution in the anode chamber. Direct current with initial current density of 1 a./dm.$^2$ is passed and pH of the solution will become 9.7 after 6 hours. The current is then cut off and concentration of the solution in the intermediate compartment gives 2.30 g. of $l$-lysine (collected as its carbonate) melting at above 190° C. Yield, 69%. Current efficiency, 67%.

The pH of the starting solution in the reaction compartment is 13.

Example 6

An electrolytic cell 5 cm. in length, as illustrated in FIGS. 9 and 11, is provided with two cation exchange membranes ($c_1$ and $c_2$) and two anion exchange membrances ($a_1$ and $a_2$) forming compartments of equal sizes ([7.5 cm.]$^2$), the membranes being all in parallel, nickel plate ([7.5 cm.]$^2$) as the cathode, and platinum plate ([7.5 cm.]$^2$) as the anode. 60 cc. of N/60 sodium hydroxide is placed in both electrode chambers and 70 cc. of 5% solution of monosodium $l$-glutamate (pH 6.8) is placed in each of the intermediate compartments, A, B, and C. Potential difference of 17.5 volts is given between the electrodes. Electrodialysis at the initial current of 0.4 a. (current density, 1.2 a./dm.$^2$) is carried out for 4 hours, at the end of which the current almost stops. The quantity of liquid in the intermediate compartments, their concentration, and pH are as follows:

| Intermediate compartment | Quantity of liquid (cc.) | Change in liquid quantity (cc.) | pH | Concentration (percent) |
|---|---|---|---|---|
| A | 59 | −11 | 3.8 | 0 |
| B | 83 | +13 | 6.0 | 8.08 |
| C | 59 | −11 | 3.4 | 0 |

Current efficiency in this electrodialysis is 74% and yield of $l$-glutamate from the intermediate compartment B is 96%.

The cation exchange membranes used are of type C-2, and the anion exchange membrane $a_1$ of type A-3, and $a_2$ of type A-2.

Example 7

An electrolytic cell, electrodes, and ion exchange membranes as described in Example 6 are used. A solution of sodium sulfate is placed in the electrode chambers, 70 cc. of 4% solution (pH 5.0) of $l$-lysine monosulfate is placed in each of the intermediate compartments A, B, and C. Potential difference of 17.0 v. is created between the two electrodes and electrodialysis is carried out at the initial current of 0.4 a. (current density, 1.2 a./dm.$^2$), by which the current will hardly flow after 4 hours. Changes in the quantity of liquid, concentration, and pH of the liquid in each compartment at the end of this period are as follows:

| Intermediate compartment | Quantity of liquid (cc.) | Change in liquid quantity (cc.) | pH | Concentration (percent) |
|---|---|---|---|---|
| A | 68 | −2 | 5.0 | 0 |
| B | 75 | +5 | 3.4 | 7.0 |
| C | 67 | −3 | 2.8 | 0 |

Current efficiency in this electrodialysis is 50% and yield of $l$-lysine salt from the intermediate compartment B is 93%.

Example 8

An electrolytic cell of 4 cm. in length, as illustrated in FIG. 8, is provided with two cation exchange membranes ($c_1$ and $c_2$) and one anion exchange membrane ($a_1$), forming compartments of [7.5 cm.]$^2$ in each, nickel plate ([7.5 cm.]$^2$) as the cathode, and platinum plate ([7.5 cm.]$^2$) as the anode. 60 cc. of N/60 sodium hydroxide is placed in the cathode chamber, 60 cc. of N/60 sulfuric acid in the anode chamber, 70 cc. of a solution containing 4.20 g. of monosodium $l$-glutamate in the intermediate compartment A, and 70 cc. of 0.1% sodium chloride solution is placed in the intermediate compartment B. Potential difference of 13 v. is given between the two electrodes and electrodialysis is carried out at the initial current of 0.56 a. (current density, 1.0 a./dm.$^2$), when the current will no longer flow after 4 hours. In the intermediate compartment B, 2.2 g. of $l$-glutamic acid of M.P., 206° C. precipitates out and concentration of the filtrate after collection of this acid affords further 1.3 g. of $l$-glutamic acid. Yield, 97%.

Membranes $c_1$ and $c_2$ are of the type C-2, and membrane $a_1$ of type A-3.

The starting solution in compartment A has a pH of 6.8. The pH of the solution in compartment B changes during the electrodialysis from 7.0 to 3.2.

Example 9

An electrolytic cell of 5 cm. in length, as illustrated in FIG. 13, is provided with two cation exchange membranes ($c_1$ and $c_2$) and two anion exchange membranes ($a_1$ and $a_2$). Sizes of the cell, and membranes, and their relationship to each other are the same as those described in Example 8. Nickel plate ([7.5 cm.]$^2$) is used as the cathode and platinum plate ([7.5 cm.]$^2$) as the anode. N/50 sodium hydroxide is placed in the cathode chamber, 50 cc. of N/50 sulfuric acid in the anode chamber, 70 cc. of 0.1% sodium chloride solution in intermediate chambers A and C, and 70 cc. of a solution containing 4.5 g. of $l$-lysine monohydrochloride in the intermediate comparement B. Potential difference of 17 v. is created between the two electrodes and electrodialysis is carried out at the initial current of 0.56 a. (current density, 1.0 a./dm.$^2$), when the current will hardly flow after 4 hours. Concentration of the solution in the intermediate compartment A gives 3.45 g. of $l$-lysine (collected as its carbonate) melting at 170–175° C. Yield, 96%. Current efficiency, 87%.

The membranes are of the following type: $c_1$=C-3; $c_2$=C-2; $a_1$ and $a_2$=A-2.

The starting solution in compartment B has a pH of 5.8. The pH in compartment A finally reaches 10.0, whereupon electrodialysis is interrupted.

Example 10

An electrolytic cell, as illustrated in FIG. 9 and having the same dimensions and size of membranes as described in Example 8, is provided with two anion exchange membranes ($a_1$ and $a_2$) and two cation exchange membranes ($c_1$ and $c_2$), nickel plate ($[7.5$ cm.$]^2$) as the cathode, and platinum plate ($[7.5$ cm.$]^2$) as the anode. The membranes $a_1$ and $a_2$ are of type A–2 and $c_1$ and $c_2$ of the type C–2. N/60 sodium hydroxide is placed in the cathode chamber, 60 cc. of N/60 sulfuric acid in the anode chamber, 70 cc. of an aqueous solution (pH 11.4) containing 4.84 g. (0.715 mole/l.) of the sodium salt of glycine in the intermediate compartment A, 70 cc. of 0.1% aqueous solution of sodium chloride in the intermediate compartment B, and 70 cc. of an aqueous solution (pH 1.8) containing 4.50 g. (0.5 mole/l.) of glycine sulfate is placed in the intermediate compartment C. Potential difference of 17 v. is created between the two electrodes and electrodialysis is carried out at the initial current of 0.7 a. (current density, 1.25 a./dm.$^2$), by which the current will hardly pass after 6 hours. The solution (93 cc. and pH about 6.0) in the intermediate compartment B is concentrated to 0.935 mol/l. affording 6.2 g. of free glycine melting at 236° C. with decomposition, and glycine is obtained in 69% yield. Current efficiency, 64%.

Example 11

An electrolytic cell, electrodes, and ion exchange membranes essentially as described in Example 9 are employed. However the cell is provided with two anion exchange membranes ($a_1$=A–4 and $a_2$=A–2) and two cation exchange membranes ($c_1$=C–2 and $c_2$=C–2) instead of ($a_1$=A–2 and $a_2$=A–2) and ($c_1$=C–2 and $c_2$=C–2).

50 cc. of N/50 sodium hydroxide is placed in the cathode chamber, 50 cc. of N/50 sulfuric acid in the anode chamber, 70 cc. of 0.1% solution of sodium chloride in each of the intermediate compartments A and C, and 70 cc. of a solution (pH 6) containing 2.0 g. of $l$-histidine hydrochloride in the intermediate compartment B. Potential difference of 18 v. is given between the two electrodes and electrodialysis is carried out at the initial current of 0.56 a. (current density, 1.0 a./dm.$^2$), by which the current will hardly pass after 3 hours, the pH in compartment A having risen to 9. Concentration of the solution in the intermediate compartment A gives 1.4 g. of histidine melting at 280° C. Yield, 87%. Current efficiency, 35%.

Example 12

An electrolytic cell provided with electrodes and ion exchange membranes as arranged in Example 9 is employed, however it is equipped with two cation exchange membranes ($c_1$=C–3 and $c_2$=C–1) and two anion exchange membranes ($a_1$=A–2 and $a_2$=A–4) instead of ($c_1$=C–3 and $c_2$=C–2) and ($a_1$=A–2 and $a_2$=A–2) in that example.

50 cc. of 1 N sodium hydroxide is placed in the cathode chamber, 50 cc. of 1 N sulfuric acid in the anode chamber, 70 cc. of 2.5% solution (pH 6.0) of sodium $l$-glutamate, containing 7.5% of ammonium chloride as an impurity, in the intermediate compartment B, and 50 cc. of 0.2% sodium chloride solution is placed in each of the intermediate compartments A and C. A potential difference of 6 v. is created between the two electrodes and electrodialysis is carried out at the initial current of 0.4 a. (current density, 0.7 a./dm.$^2$).

When the current density has decreased to 0.2 a./dm.$^2$, the pH in the compartment C then approaches 0, and the solution in that compartment contains chloride ions and $l$-glutamate anions, the former ions predominating over the latter in concentration. The solutions in the compartments A and C are respectively replaced with an aqueous solution of 0.2% NaCl and the electrodialysis is carried out again. The electrodialysis is continued until the current density which was initially 0.4 a./dm.$^2$ has decreased to 0.02 a./dm.$^2$ (the pH in the compartment C this time changes to about 1.0). The overall time spent for this electrodialysis is about 24 hours. The solution of $l$-glutamic acid hydrochloride in the intermediate compartment C is taken out and again submitted to the same electrodialysis under identical procedures, using the same electrolytic cell and electrodes.

Again, 50 cc. of 1 N sodium hydroxide solution is placed in the cathode chamber, 50 cc. of 1 N sulfuric acid in the anode chamber, 50 cc. of 0.2% solution of sodium chloride in each of the intermediate compartments A and C, while the solution of the $l$-glutamic acid hydrochloride obtained as described above (the pH being 1.0) is placed in the intermediate compartment B. A potential difference of 6 v. is created between the two electrodes, and electrodialysis is carried out at an initial current of 0.4 a. (current density, 0.7 a./dm.$^2$); the current will practically cease to flow after 24 hours at the end of which the pH in the intermediate compartment A is about 3.0. The resulting concentration of the solution in compartment A gives 1.53 g. of $l$-glutamic acid. Yield, 96%.

Example 13

An electrolytic cell, electrodes, and ion exchange membranes as described in Example 12 are employed. 50 cc. of 1 N sodium hydroxide is placed in the cathode chamber, 50 cc. of 1 N sulfuric acid in the anode chamber, 50 cc. of 0.2% solution of sodium chloride in each of the intermediate compartments A and C, and 70 cc. of 2.5% solution of $l$-lysine monohydrochloride, containing 7.5% of ammonium chloride as an impurity and having a pH of 6.0, is placed in the intermediate compartment B. Potential difference of 6 v. is created between the two electrodes and electrodialysis is carried out at the initial current of 0.4 a. (current density, 0.7 a./dm.$^2$).

When the current density decreased to 0.2 a./dm.$^2$ (the pH in the compartment A then becomes about 14), the solutions in the compartment A and C were replaced with an aqueous solution of 0.2% NaCl and the electrodialysis was carried out again. The electrodialysis was continued until the current density which was initially 0.4 a./dm.$^2$ decreased to 0.02 a./dm.$^2$ (the pH in the compartment A this time becomes about 13). The overall time spent for electrodialysis was about 24 hours.

The solution of the ammonium salt of $l$-lysine formed in the intermediate compartment A is taken out and submitted to the same electrodialysis as above, using the same electrolytic cell and electrodes. Again, 50 cc. of 1 N sodium hydroxide is placed in the cathode chamber, 50 cc. of 1 N sulfuric acid in the anode chamber, 50 cc. of 0.2% solution of sodium chloride in each of the intermediate compartments A and C, and the solution of ammonium salt of $l$-lysine obtained as above in the intermediate compartment B. Potential difference of 6 v. is created between the two electrodes and electrodialysis is carried out at the initial current of 0.4 a. (current density, 0.7 a./dm.$^2$), by which the current will hardly pass after 24 hours at the end of which the pH in compartment C has reached about 9.0. Concentration of the solution in the intermediate compartment C gives $l$-lysine as its carbonate in a yield of 67–69%.

Example 14

An electrolytic cell of 4 cm. in length, as illustrated in FIG. 8, is provided with two cation exchange membranes ($c_1$ and $c_2$) and one anion exchange membrane ($a$), forming compartments of ($[7.5$ cm.$]^2$) in all directions, the membranes and walls being parallel. Nickel plate ($[7.5$ cm.$]^2$) is used as the cathode and platinum plate ($[7.5$ cm.$]^2$) as the anode. A solution of 60 cc. of N/60 sodium hydroxide is placed in the cathode chamber, 50 cc. of diluted sulfuric acid in the anode chamber, 70 cc. of a solution containing 3.75 g. (0.05 mole) of glycine and 4.20 g. (0.025 mole) of monosodium *l*-glutamate, adjusted to pH 6.1, is placed in the intermediate compartment A, and 70 cc. of 0.1% solution of sodium chloride in the intermediate compartment B. Potential difference of 10 v. is created between the two electrodes and electrodialysis is carried out at the initial current of 0.25 a. (current density, 0.45 a./dm.$^2$), by which the current will hardly flow after 8 hours. Analysis of the solution in the intermediate compartment A shows 83% of glycine, and that in the intermediate compartment B 96% of *l*-glutamic acid.

The membranes $c_1$ and $c_2$ are of type C–1, and $a$ is of type A–3.

The pH values of the final solutions in compartments A and B are about 6.0 and 3.0, respectively.

Example 15

An electrolytic cell illustrated in FIG. 13 is provided with two cation exchange membranes ($c_1$ and $c_2$) and two anion exchange membranes ($a_1$ and $a_2$), and is similar to the cell described in Example 14, except that the length of the cell is 5 cm. Nickel plate ([7.5 cm.]$^2$) is used as the cathode and platinum plate ([7.5 cm.]$^2$) as the anode. 50 cc. of 1 N hydrochloric acid is placed in the cathode chamber, 60 cc. of N/60 sulfuric acid in the anode chamber, 70 cc. of 0.1% aqueous solution of sodium chloride in each of the intermediate compartments A and C, and 70 cc. of a solution containing 3.75 g. (0.05 mole) of glycine and 4.55 g. (0.025 mole) of *l*-lysine monohydrochloride, adjusted to pH 6.1, in the intermediate compartment B. Potential difference of 10 v. is created between the two electrodes and electrodialysis is carried out at the initial current of 0.25 a. (current density, 0.45 a./dm.$^2$), by which the current will hardly flow after 8 hours. Analysis of the solution in the intermediate compartment A shows 98% of *l*-lysine and that in the intermediate compartment B 3.5 g. (92%) of glycine.

The membranes are of the following type: $a_1$ and $a_2$ both of type A–2, $c_1$ of type C–1 and $c_2$ of type C–2.

The pH values in the compartments A and B reach finally about 4.0 and 5.0, respectively.

Example 16

An electrolytic cell of 4 cm. in length, similar to that illustrated in FIG. 13, is provided with two cation exchange membranes ($c_1$ and $c_2$) and two anion exchange membranes ($a_1$ and $a_2$), forming compartments of 5 cm.$^2$ in each dimension. The membranes are of the following types: $a_1$=A–1; $a_2$=A–4; $c_1$=C–3; and $c_2$=C–2. All other conditions are exactly the same as those described in Example 15. Nickel plate ([4 cm.]$^2$) is used as the cathode and platinum plate ([4 cm.]$^2$) as the anode, and through each electrode chamber, a 3% solution of sodium sulfate is passed so as to serve as anolyte and catholyte.

25 cc. of 0.1% solution of sodium chloride is placed in each of the intermediate compartments A and C, and 25 cc. of a solution containing 0.75 g. (0.01 mole) of glycine, 1.47 g. (0.01 mole) of *l*-glutamic acid, and 1.46 g. (0.01 mole) of *l*-lysine, adjusted to pH 6.1, is placed in the intermediate compartment B. Potential difference of 10 v. is created between the two electrodes and electrodialysis is carried out at the initial current of 0.1 a. (current density, 0.4 a./dm.$^2$), by which the current will hardly flow after 6 hours. The pH values in the intermediate compartments A, B and C finally attain about 4.0, 5.8 and 7.0, respectively. Analysis of the solution in the intermediate compartment A shows 99% of *l*-lysine, that of the solution in the intermediate compartment B 81% of glycine, and that of the solution in the intermediate compartment C 98% of *l*-glutamic acid.

Example 17

An electrolytic cell, electrodes, and ion exchange membranes as illustrated in FIGURE 13 and described in Example 15 are employed under the same conditions.

Through each electrode chamber 3% solution of sodium sulfate is passed at a flow rate of 1.2 l./dm.$^2$ surface of membrane/min. so as to serve as anolyte and catholyte. 70 cc. of 0.2% sodium chloride solution is placed in each of the intermediate compartments A and C, and 70 cc. of a solution containing 20 g. of mixed amino acids obtained by hydrolysis of casein with sulfuric acid, adjusted to pH 6.0, is placed in the intermediate compartment B. Potential difference of 10 v. is created between the two electrodes and electrodialysis is carried out at the initial current of 1.4 (current density, 0.7 a./dm.$^2$), by which the current will hardly flow after 11 hours. The pH values in the intermediate compartments A, B and C finally attain about 5.0, 5.8 and 7.2, respectively.

Concentration of the solution in each compartment affords 7.0 g. of basic amino acids, chiefly consisting of arginine, histidine, and lysine, as their hydrochlorides from the intermediate compartment A, 10.8 g. of neutral amino acids chiefly consisting of glycine, alanine, leucine, methionine, phenylalanine, threonine, tyrosine, valine, and serine from the intermediate compartment B, and 9.0 g. of acidic amino acids chiefly consisting of aspartic acid and glutamic acid, as their sodium salts, from the intermediate compartment C.

We claim:

1. A process for the production of free amino acid by electrodialysis from an aqueous solution containing a mixture of a salt of said amino acid with a mineral acid salt, wherein a potential difference is maintained between an anode and a cathode across a series of aqueous solutions of ionizable compounds contained in compartments separated alternately by ion-permselective anionic and cationic zones, which process comprises (a) introducing aqueous solution of (1) an amino acid salt, the anion of which is the amino acid, and the cation of which is a member selected from the group consisting of ions of an alkali metal and an alkaline earth metal, and (2) an electrolyte salt, the anion of which is a strong acid anion into a central compartment;

(b) introducing aqueous salt solution of neutral pH into the compartments adjacent the central compartment and positioned toward said anode and said cathode, respectively;

(c) introducing an aqueous hydrogen ion donor solution into the compartment containing said anode; and an aqueous hydroxyl ion donor solution into the compartment containing said cathode;

(d) filling the zones separating said central compartment from said compartments adjacent thereto on the anode and on the cathode side with anionic and cationic permselective porous ion-exchange resin material, respectively, the pore size of which material is about 5 to 50 Angstroms; and (e) applying such potential difference to said anode and cathode across said series of aqueous solutions that the current density is at least initially from about 0.5 to 1 ampere per square decimeter; thereby transferring simultaneously amino acid anions and said strong acid anions from said central compartment through said separating zone filled with anionic permselective material into said compartment adjacent said central compartment on the anode side, which serves as first receptor compartment from the compartment containing said anode, whereby the amino acid anions in said first receptor compartment are converted to the corresponding amino acid cations as the hydrogen ion concentration in said receptor compartment increases above that corresponding to the iso-electric point of the amino acid;

(f) interrupting electrodialysis before current flow ceases;

23

(g) removing the resulting aqueous solution of the strong acid salt of the amino acid from the receptor compartment and introducing the latter solution into the central compartment of an identical arrangement of compartments as described above;

(h), (i), (j) and (k) effecting the same steps as defined under (b), (c), (d) and (e) above, in the arrangement of compartments used in step (g);

thereby transferring amino acid cations from said central compartment to the compartment adjacent the latter on the cathode side thereof and serving as second receptor compartment, through said cationic permselective material, and hydroxyl ions from the compartment containing said cathode into said second receptor compartment;

(l) interrupting electrodialysis before current flow ceases; and (m) recovering the free amino acid from the aqueous solution thereof obtained in said second receptor compartment.

2. A process for the production of free glutamic acid by electrodialysis from an aqueous solution containing a mixture of sodium glutamate and ammonium chloride, wherein a potential difference is maintained between an anode and a cathode across a series of aqueous solutions of ionizable compounds contained in compartments separated alternately by ion-permselective anionic and cationic zones, which process comprises (a) introducing aqueous solution of sodium glutamate and of ammonium chloride into a central compartment;

(b) introducing aqueous sodium chloride solution into the compartments adjacent the central compartment and positioned toward said anode and said cathode, respectively;

(c) introducing an aqueous hydrochloric acid solution into the compartment containing said anode, and an aqueous sodium hydroxide solution into the compartment containing said cathode;

(d) filling the zones separating said central compartment from said compartments adjacent thereto on the anode and on the cathode side with anionic and cationic permselective porous ion-exchange resin material, respectively, the pore size of which material is about 5 to 50 Angstroms; and (e) applying such potential difference to said anode and cathode across said series of aqueous solutions that the current density is at least initially from about 0.5 to 1 ampere per square decimeter;

thereby transferring simultaneously glutamate anions and chloride anions from said central compartment through said separating zone filled with anionic permselective material into said compartment adjacent to the central compartment on the anode side, which serves as first receptor compartment, and transferring hydrogen ions into said first receptor compartment from the compartment containing said anode, whereby the glutamate anions in said first receptor compartment are converted to glutamic acid cations as the hydrogen concentration in said receptor compartment increases above that corresponding to the iso-electric point of glutamic acid;

(f) interrupting electrodialysis before current flow ceases;

(g) removing the resulting glutamic acid hydrochloride salt from the receptor and introducing the latter solution into the central compartment of an identical arrangement of compartments as described above;

(h), (i), (j) and (k), effecting the same steps as defined under steps (b), (c), (d) and (e) above, in the arrangement of compartments used in step (g);

thereby transferring glutamic acid cations from said central compartment to the compartment adjacent the latter on the cathode side thereof and serving as second receptor compartment, through said cationic permselective material, and hydroxyl ions from the compartment containing said cathode into said second receptor compartment;

(l) interrupting electrodialysis before current flow ceases; and (m) recovering the free glutamic acid from the aqueous solution thereof obtained in said second receptor compartment.

3. A process for the production of strong acid salt of an amino acid by electrodialysis from an aqueous solution containing a mixture of a salt of said amino acid with a mineral acid salt, wherein a potential difference is maintained between an anode and a cathode across a series of aqueous solutions of ionizable compounds contained in compartments separated alternately by ion-permselective anionic and cationic zones, which process comprises (a) introducing aqueous solution of (1) an amino acid salt, the anion of which is the amino acid, and the cation of which is a member selected from the group consisting of ions of an alkali metal and an alkaline earth metal, and (2) an electrolyte salt the anion of which is a strong acid anion into a central compartment;

(b) introducing aqueous salt solution of substantially neutral pH into the compartments adjacent the central compartment and positioned toward said anode and said cathode, respectively;

(c) introducing an aqueous hydrogen ion donor solution into the compartment containing said anode; and an aqueous hydroxyl ion donor solution into the compartment containing said cathode;

(d) filling the zones separating said central compartment from said compartments adjacent thereto on the anode and on the cathode side with anionic and cationic permselective porous ion-exchange resin material, respectively, the pore size of which material is about 5 to 50 Angstroms; and (e) applying such potential difference to said anode and cathode across said series of aqueous solutions that the current density is at least initially from about 0.5 to 1 ampere per square decimeter;

thereby transferring simultaneously amino acid anions and said strong acid anions from said central compartment through said separating zone filled with anionic permselective material into said compartment adjacent said central compartment on the anode side, which serves as first receptor compartment, and transferring hydrogen ions into said first receptor compartment from the compartment containing said anode, whereby the amino acid anions in said first receptor compartment are converted to the corresponding amino acid cations as the hydrogen ion concentration in said receptor compartment increases above that corresponding to the iso-electric point of the amino acid;

(f) interrupting electrodialysis before current flow ceases, and recovering the resulting aqueous solution of the strong acid salt of the amino acid from the receptor compartment.

4. A process for the production of a base salt of an amino acid by electrodialysis from an aqueous solution containing a mixture of a strong acid salt of said amino acid with an inorganic acid salt, wherein a potential difference is maintained between an anode and a cathode across a series of aqueous solutions of ionizable compounds contained in compartments separated alternately by ion-permselective anionic and cationic zones, which process comprises (a) introducing aqueous solution of (1) an amino acid salt, the cation of which is the amino acid, and
(2) an inorganic electrolyte salt into a central compartment;
(b) introducing aqueous salt solution of substantially neutral pH into the compartments adjacent the central compartment and positioned toward said anode and said cathode respectively;
(c) introducing an aqueous hydrogen ion donor solution into the compartment containing said anode; and an aqueous hydroxyl ion donor solution into the compartment containing said cathode;
(d) filling the zones separating said central compartments from said compartments adjacent thereto on the anode and on the cathode side with anionic and cationic permselective porous ion-exchange resin material, respectively, the pore size of which material is about 5 to 50 Angstroms; and
(e) applying such potential difference to said anode and cathode across said series of aqueous solutions that the current density is at least initially from about 0.5 to 1 ampere per square decimeter;
thereby transferring simultaneously amino acid cations and cations of said inorganic salt from said central compartment through said separating zone filled with cationic permselective material into said compartment adjacent said central compartment on the cathode side, which serves as a first receptor compartment, and transferring hydroxyl ions into said first receptor compartment from the compartment containing said cathode, whereby the amino acid cations in said first receptor compartment are converted to the corresponding amino acid anions as the hydrogen ion concentration in said receptor compartment decreases below that corresponding to the iso-electric point of the amino acid;
(f) interrupting electrodialysis before current flow ceases, and recovering the resultant aqueous solution of the salt of the amino acid anion and cation of said inorganic salt from the receptor compartment.

5. A process as in claim 4 wherein the amino acid is $l$-lycine, the electrolyte salt is ammonium chloride and the salt of the amino acid produced is the ammonium salt of $l$-lycine.

6. A method as in claim 3 wherein the amino acid is $l$-glutamic acid, the mineral acid salt is ammonium chloride and the strong acid salt produced is $l$-glutamic acid hydrochloride.

References Cited
UNITED STATES PATENTS

| | | | |
|---|---|---|---|
| 2,555,487 | 2/1948 | Haugaard et al. | 204—299 |
| 2,730,768 | 1/1956 | Clarke | 204—296 |
| 2,737,486 | 3/1956 | Bodamer | 204—72 |
| 2,921,005 | 1/1960 | Bodamer | 204—180 |
| 3,967,806 | 1/1961 | Osborne et al. | 204—72 |

OTHER REFERENCES

Alberty, "Journal of Chemical Education," August 1948, pp. 426–433.

Williams et al., "Proceedings of the New York Society for Experimental Biology and Medicine," 1929, pp. 56–59.

Williams et al., "Journal of the American Chemical Society," vol. 53, 1931, pp. 4178–4181.

JOHN H. MACK, *Primary Examiner.*

MURRAY TILLMAN, *Examiner.*

G. KAPLAN, E. ZAGARELLA, *Assistant Examiners.*